Patented Jan. 12, 1937

2,067,368

UNITED STATES PATENT OFFICE 2,067,368

HYDROGENATION CATALYST AND ITS PREPARATION

Evan Clifford Williams and Sumner H. McAllister, Berkeley, Calif., assignors to Shell Development Company, San Francisco, Calif., a corporation of Delaware No Drawing. Application March 23, 1935, Serial No. 12,736

10 Claims. (Cl. 23—236)

This invention relates to metallic catalysts, novel catalytic materials and to a novel, practical and economical method for the preparation of highly active and finely divided metals which are particularly useful as hydrogenation catalysts.

More particularly, the invention is concerned with a process for the production of an active finely divided metallic catalyst which comprises incorporating a reducible compound of a catalytic metal with an organic liquid which is substantially volatile at the temperature of operation, and heating said mixture under a superatmospheric pressure at a temperature at which reduction of the metal compound to the metallic catalyst occurs.

In this specification and the appended claims, the term "reduction" is used in its broadest sense and means the conversion of the metal contained in a metal compound to the metallic state by removal of non-metallic elements therefrom. Our process involves reduction by means of reducing agents such as hydrogen and hydrogen-containing gases as well as reduction by thermal decomposition, which decomposition may be effected in the presence or absence of a reducing substance. In some cases, particularly with the metallo-organo compounds, the reduction to the catalytic metal may proceed via thermal decomposition as well as by reduction due to reaction with a reducing gas, which reducing gas may be added or may be formed as a result of the decomposition of the metal compound. A reducible compound of a catalytic metal is a compound which is capable of being reduced to a catalytic metal by thermal decomposition, by reduction with a reducing gas or by decomposition in the presence or absence of a reducing gas.

The catalysts and catalyzer concentrates prepared in accordance with our process are useful as agents in a wide variety of chemical conversions and they are particularly useful in processes comprising catalytic hydrogenation. Due to the fact that the catalysts are prepared in a liquid volatile medium, and due to their great activity, they are particularly suitable in liquid or liquid-vapor phase hydrogenations, in which they may be employed in the presence or in the absence of the liquid media in which they are prepared. The catalysts and catalyzer concentrates prepared by our method are useful as catalysts in processes involving the hardening of oils, the production of alcohols from aldehydes and ketones, and the saturation of aromatic, aralkyl and aliphatic compounds possessing one or a plurality of olefinic linkages.

The catalysts prepared in accordance with this invention are particularly adaptable to use as agents in the liquid phase as well as vapor phase hydrogenations of the higher olefines and olefine polymers to valuable saturated hydrocarbons which are useful as fuels and as components of fuel and lubricating oil compositions. For example, in accordance with our invention, an active catalytic metal may be prepared in a volatile olefine polymer such as diisobutylene, triisobutylene, diisoamylene, etc. and the liquid medium then hydrogenated without separating the catalyst therefrom, or a catalyzer concentrate comprising the catalytic metal suspended in a relatively small amount of such an olefine polymer may be added to a large amount of an olefine polymer or mixtures of such polymers to be hydrogenated. If desired, the catalyst may be prepared in a liquid paraffin which may or may not be the same nature as the hydrogenation product of the material to be hydrogenated.

In accordance with the present invention, a compound of a catalytic metal capable of being reduced, either by thermal decomposition and/or reduction with a reducing agent, to a finely divided catalytic metal, is dissolved, suspended or carried in an organic liquid medium which is substantially volatile at the temperature at which reduction is to be effected, and the required reduction is effected under an elevated pressure, solely by heating, or by heating in the presence of an introduced inert or reducing gas or gaseous mixture. Whether or not a reducing gas such as hydrogen or a hydrogen-containing gas can be dispensed with is dependent upon the nature of the metal compound undergoing reduction. For example, the metal compounds which cannot be thermally decomposed to the catalytic metal or which require such high temperatures for decomposition that catalytic activity of the metal may be impaired and excessively high pressures necessitated such as the metal oxides, hydroxides, nitrates, carbonates, etc., are advantageously reduced in the presence of hydrogen. With the compounds more readily decomposed to the metallic state by heat alone, we may or may not employ an added reducing gas depending upon the nature of the compound undergoing reduction, upon the decomposition products and upon the temperature of operation. In the case that decomposition of a metal compound results in the formation of a reducing gas or gaseous mixture comprising a reducing gas, decomposition as well as reduction by reaction may occur without the introduction of a material capable of effecting reduction.

Our invention is executed by heating a reducible compound of a catalytic metal incorporated with a body of a liquid organic substance which may be a single compound or a mixture and which is substantially volatile at temperatures at which reduction is advantageously effected. Such a suitable volatile liquid will, in a closed system, exert a relatively high vapor pressure at the temperature at which it is employed and, at such a temperature, will be partly converted to the vapor state without substantial decomposition, cracking, polymerization, condensation, etc.

We have found numerous advantages to be inherent in effecting the reduction of metal compounds to metallic catalysts in organic liquid media which are volatile at temperatures favorable to catalyst preparation. For example, in those cases where it is desirable to operate under pressures greater than atmospheric, we need not introduce large amounts of inert and/or reducing gases to maintain favorable pressures in the system. By our method, particularly where substantially only thermal decomposition is relied upon, the reduction may be effected at the desired pressure by selecting the volatile liquid medium which will exert the requisite vapor pressure at the temperature of operation. When the employment of an added reducing gas is necessary or desirable, such a gas need not be added in the excessive amounts required to maintain the pressure in the system. A further advantage resides in the use of the vapors of the liquid media to sweep the gaseous decomposition and/or reduction products from the system. During the reduction of the metal compounds to catalytic metals, decomposition and/or reduction products are formed which may on prolonged contact with the catalyst formed or being formed detrimentally affect its catalytic activity. Accordingly, it is generally desirable that such materials be removed from the system substantially as soon as they are formed therein. When reduction is effected in non-volatile media such as the heavy oils and waxes hitherto employed, this removal of deleterious gaseous substances usually required the continual passage of an inert or reducing gas through the reaction mixture. By our method such deleterious substances, which usually exist in the gaseous state under conditions of operation, such as carbon oxides, nitrogen oxides, water and the like, are more readily, economically and effectively removed from the system by operating with the volatile liquid under its own vapor pressure in a closed system and utilizing the vapors of the liquid to sweep gaseous reaction products from the system. This is accomplished in a practical manner by continuously or from time to time venting the system during the operation. A suitable condenser may be in communication with the reaction vessel. The gases vented from the reaction vessel may be passed into the condenser wherein the condensible materials such as the organic medium and water, if water is present, are liquefied and thereby separated from the normally gaseous materials. The condensed organic material may be returned to the same or another reaction vessel for reutilization therein. If the condensed material contains water and it is not desirable to reintroduce water into the system therewith, the water may be separated from the organic volatile liquid by any suitable drying operation prior to its reutilization.

Any compound of a catalytic metal that is reducible by either thermal decomposition and/or by reduction with hydrogen to a catalytic metal may be advantageously employed in the execution of our invention. Active metallic catalysts of particular value in hydrogenation reactions may be prepared by effecting the reduction of the reducible compounds of catalytic metals as nickel, iron, cobalt, chromium, manganese, titanium, molybdenum, vanadium, thorium, copper, the metals of the platinum group and the like. The metal compounds may be reduced severally or in combination. For example, if a mixture of catalytic metals is desired, we may effect the reduction of a suitable mixture of metal compounds capable of yielding the desired composition of catalytic metals. Particularly active catalysts may be prepared by effecting the thermal decomposition and/or reduction of the oxides, hydroxides, carbonates, carbonyls, metallo-organo compounds, salts of organic acids and the like of the more readily available and less costly base metals such as those of the iron subgroup, particularly nickel. Particularly suitable nickel compounds which yield a finely divided metallic nickel of great catalytic activity are the nickel salts of carboxylic acids, for example, the nickel formates, acetates, propionates, butyrates, valerates, oxalates, citrates, oleates and the like. Such compounds will in the majority of cases undergo reduction by thermal decomposition at moderately elevated temperatures and an elevated pressure in the presence or in the absence of an added reducing gas. Nickel formate is a readily available and inexpensive nickel compound which may be readily reduced to a very active hydrogenation catalyst by our method.

If desired the metal compounds such as the hydroxides, carbonates, nitrates, etc. may be converted to the metal oxides by the known methods such as by calcination and the oxides then treated in accordance with our invention in the presence of a suitable reducing gas such as hydrogen. Water formed in the course of the reaction may be removed from the system by means of the vapors of the volatile suspensory medium. In some cases, it may be desirable to have the catalytic material supported on a relatively inert carrier. Supported catalysts of this sort may be readily prepared by impregnating the supporting material with a solution of the metal compound, or precipitating the metal compound on the surface of the supporting material, and then effecting reduction of the deposited metal compound in a volatile organic liquid medium in the manner herein described. As supporting material we prefer to use porous materials as pumice, kieselguhr, silica gel, charcoal and the like, which materials may be employed as powders, pellets, granules, etc. When promoted catalysts are desired, compounds of metals which, when in the metallic state, are capable of acting as promoters may be added and reduced along with the compound of the catalytic metal. If desired, a suitable promoter may be added to the catalyzer concentrates or compositions prepared by our method.

The choice of a suitable organic liquid that is substantially volatile at the reduction temperature employed will in general be dependent upon its vapor pressure and stability at the temperature necessary to effect reduction of the particular metal compound or compounds to an active metallic catalytic material. The saturated as well as unsaturated hydrocarbons, which are substantially volatile and preferably capable of boiling without substantial decomposition at atmospheric pressure at temperatures in the range of from about 100° C. to about 250° C. are particularly suitable and preferably employed. The hydrocarbons boiling above about 250° C. are generally not sufficiently volatile and, in addition, they may undergo considerable cracking at the temperatures usually employed for reduction. When hydrocarbons or hydrocarbon mixtures normally boiling below about 100° C. are used, the process is operative but the high vapor pressure of the volatile material at the temperature necessary for reduction of the metal compound may prove uneconomical in that costly high-pressure equipment is necessitated.

In the majority of cases, we prefer to execute our invention employing, severally or in mixtures, the saturated and/or unsaturated hydrocarbons possessing at least eight carbon atoms to the molecule. For our purpose, the olefine polymers and the corresponding saturated hydrocarbons are particularly suitable volatile media. A group of such compounds includes, among others, diisobutylene, triisobutylene, tetraisobutylene, diisoamylene, triisoamylene, isooctane, isodecane, isododecane and the like. Isododecane, by virtue of its volatility and boiling temperature (about 178° C.) is a particularly suitable medium in which reduction may be effected. Excellent results may be obtained, for example, by effecting the thermal decomposition of metal salts of organic acids in isododecane. Nickel formate may be reduced to a very active finely divided metallic nickel by suspending it in isododecane and heating the mixture at a temperature of from about 250° C. to 300° C. under the vapor pressure of the isododecane (about 200 lbs./sq. in. at about 300° C.).

The following specific example illustrates a mode of executing our invention to obtain an active finely divided metallic nickel particularly suitable as a catalyst in the hydrogenation of olefine polymers. It is to be understood that this example is merely illustrative of a specific embodiment of our invention and that the invention is not limited to the procedure, specific materials or specific conditions of this experiment.

About 510 gm. of nickel formate (Ni(CHO$_2$)$_2$.2H$_2$O), in a powdered form, were suspended in about 1500 cc. of isododecane and the mixture charged to an autoclave. The autoclave employed was equipped with a mechanical stirrer and means for heating and cooling its contents. The exit gas line of the autoclave contained, in series, a condenser and trap, the trap in turn being in communication with the autoclave in such a manner that its contents could be intermittently or continuously forced, by pressure, into the autoclave.

With the exit valve of the autoclave open, the mixture was heated until isododecane and water formed by dehydration of the formate began to distill from the system. The exit valve was then closed and the temperature raised to and maintained at about 300° C. for about 3 hours. During this time the pressure in the autoclave was maintained at about 200 lbs./sq. in. by from time to time venting the autoclave and allowing the vapors to leave via the exit gas line. The nickel formate appears to decompose, for the most part, in accordance with the equation:

$$Ni(CHO_2)_2.2H_2O \rightarrow Ni + 2CO_2 + 2H_2O + H_2$$

The vapors of the isododecane were employed to sweep the gaseous products of decomposition from the system. The gases vented from the autoclave were cooled in the condenser and isododecane and water condensed at atmospheric pressure. The permanent gases were vented from the condenser while the condensed liquid was passed into a trap wherein stratification into an aqueous layer and an isododecane layer was effected. The recovered isododecane was returned to the autoclave for reutilization therein.

About 160 gm. of a finely divided metallic nickel was obtained, which catalytic metal was, without separating it from the isododecane in which it was prepared, particularly valuable for effecting the liquid phase hydrogenation of the olefine polymers as diisobutylene, triisobutylene and the like.

Operating in accordance with the procedure of this example, wherein the isododecane is trapped and returned to the conversion chamber, the only appreciable loss of isododecane was confined to that carried away in the uncondensable gases discharged from the condenser. When the vented isododecane-decomposition gas mixture was condensed at about 30° C. under a pressure of about 200 lbs./sq. in., this loss was equal to about 1.5 gm. isododecane per pound of nickel produced.

A suitable mode of executing our invention comprises effecting the reduction of a suitable compound of a catalytic metal in an unsaturated compound capable of being hydrogenated, for example, in an olefine polymer. A suitable metal compound as nickel formate may be incorporated with an unsaturated volatile hydrocarbon as diisobutylene and reduction effected in the presence or absence of inert and/or reducing gases. When the reduction to the catalyst is complete or during said reduction, hydrogen may be added under suitable conditions and hydrogenation of the supporting medium effected. This procedure eliminates the step of separating the catalytic material from the protecting medium and also eliminates contamination due to preparing the catalyst in a material dissimilar to that to be hydrogenated. When operating in this manner, it is not necessary to restrict the amount of the metal compound to an amount capable of furnishing a quantity of catalyst sufficient to effect hydrogenation of the amount of the unsaturated liquid medium employed. We may use a considerable excess of the compound of the catalytic metal and obtain a catalyzer concentrate which may be added in the required amount to a large volume of the same or another compound to be hydrogenated. As another method of preparing a catalyzer concentrate consisting of the catalytic metal and a volatile unsaturated or saturated hydrocarbon comprises reduction of a suitable metal compound in said volatile liquid and removing the desired amount of the liquid during or after reduction by any suitable means as evaporation, distillation, filtration, decantation and the like. In general, the liquid phase hydrogenation of olefine polymers is effected with the catalytic metal present in an amount equal to about 4% by weight of the unsaturated material to be hydrogenated. The catalyzer concentrate which contains the catalyst in excess of this amount may be added to a sufficient quantity of unsaturated material to obtain the desired catalyst concentration.

It will be evident that the volatile organic liquid which forms the vehicle in which reduction is effected will form a sealing fluid or medium by means of which the catalytic metal is protected against loss of activity due to contact with air and other substances. In the volatile liquid media specified herein, the prepared catalysts may be preserved indefinitely without suffering any appreciable loss of activity. This is another decided advantage inherent in catalyst preparation by our method. When reduction is effected in non-volatile and decomposable material as vegetable and heavy mineral oils, the catalytic material loses activity on prolonged contact with such media thereby necessitating its separation therefrom and/or its use substantially after its preparation.

Another advantage of preparing and preserving the catalytic material in a volatile organic liquid medium is that the catalytic material need not be separated from the liquid medium prior to its use in processes involving the hydrogenation of materials similar or dissimilar to said medium, since the liquid introduced with the catalyst or its hydrogenation product can, in the majority of cases, be separated from the dissimilar hydrogenation product by distillation or other suitable means. If the catalyst medium and the material are compatible separation is in many cases unnecessary. For example, in the preparation of iso-octane for fuel purposes by hydrogenating diisobutylene, the catalyst may be prepared in isododecane and the isododecane added with the catalyst need not be separated from the iso-octane since it is a valuable component of iso-octane fuels.

Although this invention has been described with particular reference to the preparation of metallic catalysts for use in preferably liquid phase hydrogenation processes, it is to be understood that said catalysts are also adaptable to use in gas phase hydrogenations. The dry catalytic material in an active and finely divided state may be obtained by decanting or filtering the liquid from the catalytic material. If the state of subdivision of the catalytic material does not permit its ready separation from the liquid by decantation and/or filtration, that is, if the catalyst is obtained therein in a non-settling state, a catalyzer concentrate or the substantially liquid free catalyst may be obtained by vaporizing the vaporizable liquid therefrom. The vaporization may be effected by heating the mixture under a reduced pressure or by heating at atmospheric or elevated pressures. Inert and/or reducing gases may be used to carry the vapors of the liquid from the mixture. Substantially complete removal of the liquid may be effected without detriment to the activity of the catalyst provided such removal is effected at sufficiently low temperatures and in substantial absence of oxidizing substances.

The temperature and pressure under which the present invention is executed will be dependent upon the particular metal compound to be reduced and upon the atmospheric boiling temperature of the volatile liquid medium employed. The activity and state of subdivision of the catalyst will be dependent to a certain extent on the temperature at which reduction is effected. The invention is usually executed at temperatures sufficiently high to effect reduction at a practical rate while producing an active metallic catalyst. When the reaction is one which comprises reduction by substantially only thermal decomposition, as when the organic acid salts of metals are reduced, the liquid medium carrying the decomposable metal compound is heated to the decomposition temperature of the metal compound and preferably to a temperature of from about 5° C. to about 25° C. higher. For example, a very suitable nickel catalyst may be prepared by reducing nickel formate, in the presence or absence of reducing and/or inert gases, at temperatures of from about 250° C. to about 350° C. although a sufficiently active catalyst may be obtained at higher or lower temperatures.

The pressure at which we execute our invention is, for the most part, dependent upon the vapor pressure of the volatile organic liquid medium at the temperature at which reduction of the metal compound is effected. The particular volatile liquid organic compound or mixture is preferably selected with respect to its vapor pressure at the temperature of operation so that the volatile material exists as a liquid in the system under only moderately elevated pressures. Generally, we prefer to operate at pressures greater than atmospheric but not substantially in excess of about 25 atmospheres, but higher pressure may be employed when necessary or desirable.

The metal compounds reduced, the volatile liquid media employed and the reducing or inert materials introduced should be substantially free of substances capable of exercising a deleterious effect upon the activity and/or life of the catalytic material. Detrimental amounts of sulphur, sulphur compounds, halides, organic halogen compounds, oxygen, peroxides and the like catalyst poisons should be removed from any of the materials prior to execution of the invention. Said removal may be effected in any suitable manner as by reaction, oxidation, extraction, distillation and the like.

It will be apparent to those skilled in the art to which our invention appertains that the same may be executed in a batch, intermittent or continuous manner.

As many apparently different embodiments of this invention may be made without departing from the scope thereof, it is to be understood that the same is not to be regarded as limited to the details and materials of operation herein described but is to be regarded as limited only by the terms of the appended claims.

We claim as our invention:

1. A process for the production of an active finely divided metallic catalyst which comprises incorporating a compound of a catalytic metal reducible by thermal decomposition with a liquid hydrocarbon which is substantially volatile at the temperature of operation and heating said mixture under a superatmospheric pressure at a temperature at which the metal compound is decomposed to an active metal catalyst, and using at least a part of the vapors of the volatile liquid hydrocarbon to sweep the gaseous decomposition products from the system.

2. A process for the production of an active finely divided metallic catalyst which comprises incorporating a reducible compound of a catalytic metal with a liquid hydrocarbon which normally boils at a temperature of from about 100° C. to about 250° C. and heating said mixture under a superatmospheric pressure to a temperature at which reduction of the metal compound to a catalytic metal occurs, and using at least a part of the vapors of the volatile liquid hydrocarbon to sweep gaseous decomposition products from the system.

3. A process for the production of an active finely divided metallic catalyst which comprises incorporating a reducible nickel compound with a liquid hydrocarbon which is substantially volatile at the temperature of operation and heating said mixture under a superatmospheric pressure at a temperature at which reduction of the nickel compound to catalytic nickel occurs, and using at least a part of the vapors of the volatile liquid hydrocarbon to sweep gaseous decomposition products from the system.

4. A process for the production of an active finely divided metallic catalyst which comprises incorporating a nickel salt of a carboxylic acid with a liquid hydrocarbon which is substantially volatile at the temperature of operation and heating said mixture under a superatmospheric pressure at a temperature at which thermal decomposition of the nickel compound to catalytic nickel occurs, and using at least a part of the vapors of the volatile liquid hydrocarbon to sweep gaseous decomposition products from the system.

5. A process for the production of an active finely divided metallic catalyst which comprises suspending a nickel formate in a liquid hydrocarbon which is substantially volatile at the temperature of operation and heating said mixture under a superatmospheric pressure at a temperature at which thermal decomposition of the nickel formate occurs, and using at least a part of the vapors of the volatile liquid hydrocarbon to sweep gaseous decomposition products from the system.

6. A process for the production of an active finely divided metallic catalyst which comprises suspending nickel formate in a hydrocarbon which normally boils at a temperature of from about 100° C. to about 250° C. and heating the mixture under a superatmospheric pressure to a temperature of from about 250° C. to about 350° C., and using at least a part of the vapors of volatile liquid hydrocarbon to sweep gaseous decomposition products from the system.

7. A process for the production of an active finely divided metallic catalyst which comprises suspending nickel formate in isododecane and heating the mixture under a superatmospheric pressure to a temperature of from about 250° C. to about 350° C., and using at least a part of the vapors of volatile liquid hydrocarbon to sweep gaseous decomposition products from the system.

8. A process for the production of an active finely divided metallic catalyst which comprises incorporating a reducible nickel compound with a liquid hydrocarbon substantially volatile at the temperature of operation and heating the mixture in a closed system under a superatmospheric pressure at a temperature at which reduction of the nickel compound occurs, and using the vapors of the volatile liquid hydrocarbon to sweep the gaseous products of reduction from the system, condensing the hydrocarbon material and returning the same to the system for reutilization therein.

9. A process for the production of an active finely divided metallic catalyst which comprises incorporating a reducible compound of a catalytic metal with an organic liquid which is substantially volatile at the temperature of operation, heating said mixture under a superatmospheric pressure at a temperature at which reduction of the metal compound to a catalytic metal occurs, and using at least a part of the vapors of the volatile organic liquid to sweep the gaseous decomposition products from the system.

10. A process for the production of an active finely divided metallic catalyst which comprises suspending nickel formate in an unsaturated olefine polymer containing at least eight carbon atoms and which is volatile at the temperature of operation, heating the mixture under a superatmospheric pressure to a temperature of from about 250° C. to about 350° C., and using a part of the vapors of the hydrocarbon to sweep gaseous decomposition products from the system.

EVAN CLIFFORD WILLIAMS.
SUMNER H. McALLISTER.